(12) United States Patent
Jacob et al.

(10) Patent No.: US 8,341,053 B2
(45) Date of Patent: Dec. 25, 2012

(54) CREDIT-DEFAULT SWAP TRUSTEE AND COLLATERAL MANAGER

(75) Inventors: Outhicamannil Sam Jacob, Stamford, CT (US); Vipul Pal, New York, NY (US)

(73) Assignee: The Bank of New York Mellon, New York, NY (US)

( * ) Notice: Subject to any disclaimer, the term of this patent is extended or adjusted under 35 U.S.C. 154(b) by 362 days.

(21) Appl. No.: 12/613,162

(22) Filed: Nov. 5, 2009

(65) Prior Publication Data

US 2010/0125517 A1   May 20, 2010

Related U.S. Application Data

(60) Provisional application No. 61/114,980, filed on Nov. 14, 2008.

(51) Int. Cl.
*G06Q 40/00* (2012.01)
(52) U.S. Cl. .......................................................... 705/35
(58) Field of Classification Search ................ 715/1–19; 705/1–50; 700/1, 29–30; 707/607–822
See application file for complete search history.

(56) References Cited

U.S. PATENT DOCUMENTS

2008/0215430 A1* 9/2008 Ellis et al. ........................ 705/14

OTHER PUBLICATIONS

Moorad Choudhry, The credit default swap basis: illustrating positive and negative basis arbitrage trades, Jul. 2006, YieldCurve.com, web, 1-8.*
Search Report in related European application 09 17 5814.4 mailed Dec. 30, 2009.

* cited by examiner

*Primary Examiner* — Marissa Liu
(74) *Attorney, Agent, or Firm* — Pillsbury Winthrop Shaw Pittman LLP

(57) ABSTRACT

Systems and methods are provided for a CDS trustee and collateral manager. In some embodiments, the systems and methods of the invention may provide a holistic approach to CDS transactions which facilitates such transactions, enables the management of such transactions, streamlines the resolution of these transactions, improves market information relating to these transactions, and provides other advantages. In some embodiments, a CDS trustee is provided that manages CDS documentation throughout the CDS transaction market and therefore can determine the positions and exposure of all market players. In some embodiments, the CDS trustee may also monitor for and process credit events of a reference entity to a CDS transaction. Furthermore the CDS trustee may facilitate payments to and from counterparties to CDS transactions, facilitate unwinding of CDS transactions, facilitate settlement of CDS transaction in the event of a credit default, and/or provide other features and functions. In some embodiments, a collateral manager is provided to enable the use of securities as collateral and other collateral management for CDS transactions.

16 Claims, 11 Drawing Sheets

CREDIT-DEFAULT SWAP TRUSTEE AND COLLATERAL MANAGER

This application claims the benefit of U.S. Provisional Patent Application No. 61/114,980, filed Nov. 14, 2008, the entire contents of which are hereby incorporated herein by reference.

FIELD OF THE INVENTION

The invention relates to a computer implemented system for providing collateral management and trustee services for credit default swap transactions.

BACKGROUND OF THE INVENTION

Credit default swap (CDS) transactions or "CDS trades" typically refer to contracts between two "counterparties" wherein a first counterparty (i.e., a CDS buyer) makes one or more periodic payments to a second counterparty (i.e., a CDS seller) in exchange for payment by the second counterparty to the first counterparty if an underlying financial instrument defaults. The underlying financial instrument and its associated entity may be referred to as the "reference entity" or in general as the "obligation." From a certain perspective, CDS transactions resemble an insurance contract in that the payments from the CDS buyer to the CDS seller may be thought of as "premium payments" that are made in return for a presumably large payment upon the occurrence of an event, namely if a specified financial instrument fails. In many instances, the underlying financial instrument is a bond or a loan, however, other instruments may be used. However, unlike typical insurance, the CDS buyer need not own the underlying financial instrument.

However, as the number and complexity of CDS transactions increase, concerns arise as to several aspects of the current system for managing and monitoring these type of transactions. For instance, three or more parties engaged in multiple CDS transactions may create circuitous obligations and positions. In other instances, the large volume of CDS transactions may obscure the exact position and exposure of various market participants. In many instances, the exact exposure of parties to a CDS transaction (i.e., who owns what products and what the net exposures are) is known only on a bilateral basis (i.e., to the two participants to that transaction). This may form a tangled web of positions and exposures that may endanger the market as whole. In some instances, delays in the affirmation and confirmation of the existence of CDS transactions also contribute to the lack of information in the marketplace as a whole.

Many other concerns relating to imperfect information among market participants may exist. For instance, the occurrence of credit events relating to reference entities such as, for example, bankruptcy, failure to pay, restructuring, repudiation, moratorium, credit downgrades, or other credit event may affect payment responsibilities of counterparties to a CDS transaction. However, the determination of when a credit event has occurred is often left to the CDS buyer. Thus, from a perspective outside the specific CDS transaction, it can be difficult to determine when a credit event has occurred.

In some instances, clearinghouse entities may exist to mediate and/or assist with certain of a CDS transaction. However, these clearinghouses, inter alia, may not provide adequate and timely information to the market as it relates to pricing individual counterparty exposure and systemic risk. These and other problems exist.

BRIEF SUMMARY OF THE INVENTION

The invention solves these and other problems in the field by providing computer-implemented systems and methods for providing a CDS trustee and a collateral manager. In some embodiments, the systems and methods disclosed herein may provide a holistic approach to CDS transactions which facilitates not only such transactions, but enables the management of such transactions, streamlines the resolution of these transactions, improves market information relating to these transactions, and provides other advantages.

In some instances, deploying a central counterparty (i.e., a clearinghouse) to novate trades between counterparties may buffer some negative impact. However, clearinghouses may only partially solves problems in the field. The systems described herein compliment the capability of the clearinghouse with a CDS trustee who holds CDS documentation (i.e., the master CDS agreements, affirmations, confirmations, and/or other agreements or documents) and/or may perform other beneficial functions. If the CDS trustee holds this information throughout the CDS transaction in the market, the trustee knows who all the buyers and sellers are and can provide reporting and analytics that reduce systemic risk (because a single, unbiased entity knows all the net buys and net sells of the market participants), thus providing a holistic view of the market and providing more robust risk management.

In some embodiments, the CDS trustee may also monitor for and process credit events of a reference entity to a CDS transaction. Currently, credit event monitoring and processing is done via "back office" parties that may be biased towards one outcome or another and thus may have incentive to provide untimely or even misleading information. Furthermore, the CDS trustee may facilitate payments to and from counterparties to CDS transactions, facilitate unwinding of CDS transactions, facilitate settlement of CDS transactions in the event of a credit default, and/or provide other features and functions. In some embodiments, a collateral manager is provided to enable the use of securities as collateral and to provide other collateral management for CDS transactions.

These and other objects, features, and advantages of the invention will be apparent from the detailed description and the attached drawings. It is understood that both the foregoing summary and the following detailed description are for exemplification of features of the invention and are not restrictive as to the scope of the invention.

DETAILED DESCRIPTION OF THE INVENTION

The present invention provides computer-implemented systems and methods for providing a CDS trustee and CDS collateral management services. In some embodiments, the systems and methods disclosed herein may provide a holistic approach to CDS transactions which facilitates such transactions, enables the management of such transactions, streamlines the resolution of these transactions, improves market information relating to these transactions, and provides other advantages.

Figure 1:
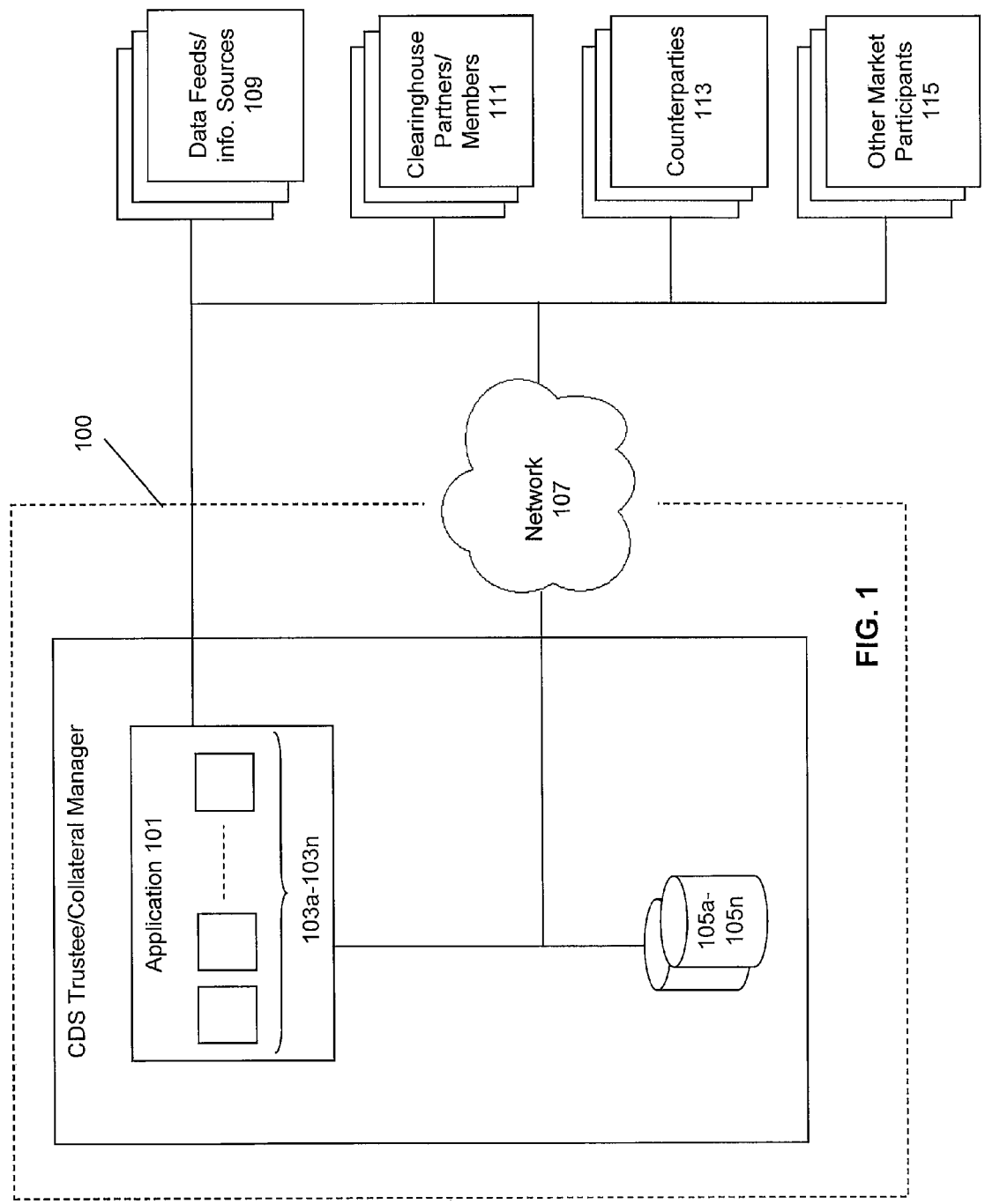
FIG. 1 illustrates a system for providing a CDS trustee, CDS collateral manager and CDS clearinghouse, according to various aspects of the invention.

In some embodiments, the systems and methods disclosed herein may include and/or utilize one or more computer-implemented systems. FIG. 1 illustrates a system 100, which is an example of a system for providing CDS trustee, collateral management, CDS clearinghouse, and/or other CDS-related services. System 100 may include one or more computer software applications such as, for example, an application 101. Application 101 may include one more software modules 103*a*-103*n* for supporting and/or enabling the processes, methods, operations, features and/or functions of the invention described herein. In some embodiments, application 101 may be supported by and/or operate on one or more computing devices which may include one or more servers, desktop computers, laptop computers, handheld computers, PDA's, smart phones, or other computing devices having one or more processors. In some embodiments, software application 101 and/or module 103*a*-103*n* may include instructions for causing or configuring one or more microprocessors or other processing devices of the one or more computing devices to perform the features and functions described herein.

In some embodiments, one or more modules 103*a*-103*n* may include one or more modules supporting or enabling collateral management, including all of the collateral management features and functions discussed herein. In some embodiments, one or more modules 103*a*-103*n* may include one or more modules supporting or enabling credit event monitoring and subsequent processing, including all of the credit event-related features and functions discussed herein. In some embodiments, one or more modules 103*a*-103*n* may include one or more modules supporting or enabling payment processing features, including all of the payment processing features discussed herein. In some embodiments, one or more modules 103*a*-103*n* may include one or more modules supporting or enabling CDS transaction unwinding features, including all of the CDS transaction unwinding features discussed herein. In some embodiments, one or more modules 103*a*-103*n* may include one or more modules supporting or enabling CDS settlement, including all of the CDS settlement features discussed herein. In some embodiments, one or more modules 103*a*-103*n* may include one or more modules supporting or enabling reporting of or access to information relating to CDS transactions, including all of the reporting and access features discussed herein.

In some embodiments, system 100 may include one or more data storage components 105*a*-105*n*. In some embodiments, data storage components 105*a*-105*n* may include one or more data storage devices, databases, memory, and/or other devices necessary or desired for the various features or functions described herein.

Data storage components 105*a*-105*n* may be, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Language Query), a SAN (storage area network), Microsoft Access™ or others may also be used, incorporated, or accessed.

In some embodiments, system 100 may include a computer network 107. In some embodiments, network 107 may be and/or include the Internet, an intranet, a local area network (LAN), a wide area network (WAN), or other computer network enabling communication among the various elements of system 100 and/or other computer systems and elements. Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, a cellular connection, a fiber-optic connection, or other connection. One or more security technologies may be used to ensure the security of information across all parts of the system, where necessary. For example Secure Socket Layer (SSL) protocol and bank level SSL may be utilized to ensure the authenticity and security of messages passed across the network.

In some embodiments, all or part of application 100 may be accessible as a website or one or more web pages available to client computers via the Internet, which may be or include network 107.

In some embodiments, system 100 may include, interface with, and/or otherwise send and/or receive information with one or more data feeds 109 or other information sources such as, for example, news sources (e.g., Bloomberg, Dow Jones, Wall Street Journal, etc.), the Depository Trust & Clearing Corporation (DTCC), a private entity's corporate trust department or other department, one or more regulatory agencies, one or more credit agencies, one or more exchanges (e.g., Options Clearing Corporation—OCC; New York Stock Exchange—NYSE; IDCG, Chicago Mercantile Exchange—CME; ICE Trust, etc.), one or more courts, market participants, or other entities or sources.

In some embodiments, system 100 may include, interface with, and/or otherwise exchange information with one or more CDS clearinghouse partners 111, one or more counterparties 113, and/or one or more other market participants 115. This information exchange may be conducted through network 107 or other information exchange method so as to support or enable the features and functions described herein.

Those having skill in the art will appreciate that systems described herein may work with various system configurations. Accordingly, more or less of the aforementioned system components may be used and/or combined in various embodiments. As discussed herein, it should also be understood that various software modules 103a-103n and application 101 that are utilized to accomplish the functionalities described herein may be maintained on computer-implemented devices that include one or more processing devices, as necessary. In some embodiments the invention may include one or more processors programmed by computer-executable instructions such that the one or more processors are configured to perform some or all of the features or functions described herein. In some embodiments, as would be appreciated, the functionalities described herein may be implemented in various combinations of hardware and/or firmware, in addition to, or instead of, software. In some embodiments, the invention may include tangible computer readable media (e.g., a disk, memory stick, or other non-volatile media or other tangible media) having computer-executable instructions thereon that cause one or more processors to perform some of all of the features and functions described herein.

Figure 2:
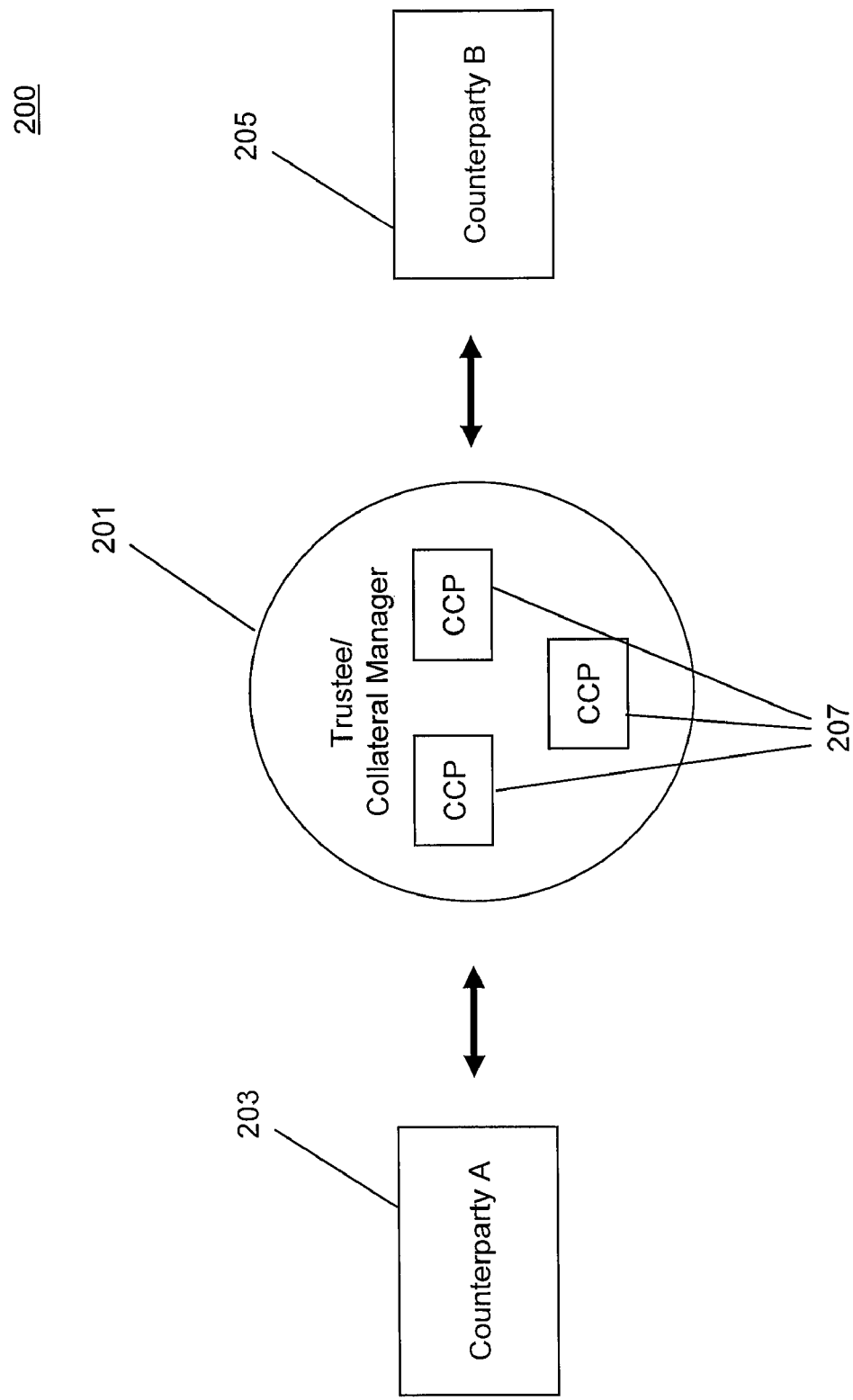
FIG. 2 illustrates a system, wherein a CDS trustee/collateral manager facilitates CDS transactions for two counterparties, according to various aspects of the invention.

FIG. 2 illustrates an example of a CDS transaction 200 wherein a CDS trustee/collateral manager 201 facilitates, manages, or otherwise provides services relating to a CDS transaction between a Counterparty A (203) and a Counterparty B (205). In some instances, Counterparty A may be a CDS buyer and Counterparty B may be a CDS seller. In some instances, the reverse may be true. In some instances involving multiple CDS transactions either of the illustrated counterparties may be both CDS buyers and sellers.

In some embodiments, CDS trustee/collateral manager 201 may utilize the systems and methods disclosed herein to provide CDS transaction support with a holistic approach. For example, in some embodiments, CDS trustee/collateral manager 201 may cooperate with one or more clearinghouse partners 207. Whereas typical proposals for facilitating CDS transactions address issues relating thereto from a siloed perspective, use of a CDS trustee/collateral manager supported by the systems and methods disclosed herein provide a comprehensive holistic view into counterparty positions and exposures. Furthermore, given that typical credit event settlement can be biased towards a given counterparty, use of a CDS trustee/collateral manager supported by the systems and methods disclosed herein may facilitate an orderly, non-biased credit event settlement process that utilizes an un-conflicted position (i.e., the position of the unbiased CDS trustee/collateral manager 201). Also, whereas during typical CDS transactions open positions are not adequately collateralized and positions are only managed on a credit basis, use of a CDS trustee/manager supported by the systems and methods disclosed herein provide margin and collateral management services that extend the types of collateral that can be used and ensure collateral adequacy for a given transaction. Additionally, whereas typical CDS transactions can involve default unwinds that are cumbersome and position holdings that are not transparent, the systems and methods disclosed herein enable a CDS trustee/collateral manager to integrate with a clearinghouse partner (e.g., CCP 207) and provide operational capability to support orderly and efficient position unwinds. Furthermore, the CDS trustee/manager provided herein may include backing or operation by an entity that includes sufficient capital to serve as a liquidity backstop for supporting one or more clearinghouse partners 207.

In general, the use of the systems and methods disclosed herein to provide a CDS trustee/collateral manager provides transparency from beginning to end of CDS transactions, rather than at the point of trade only. This CDS trustee/collateral manager provides an unbiased CDS transaction facilitator and a holistic view of CDS transactions.

Figure 3:
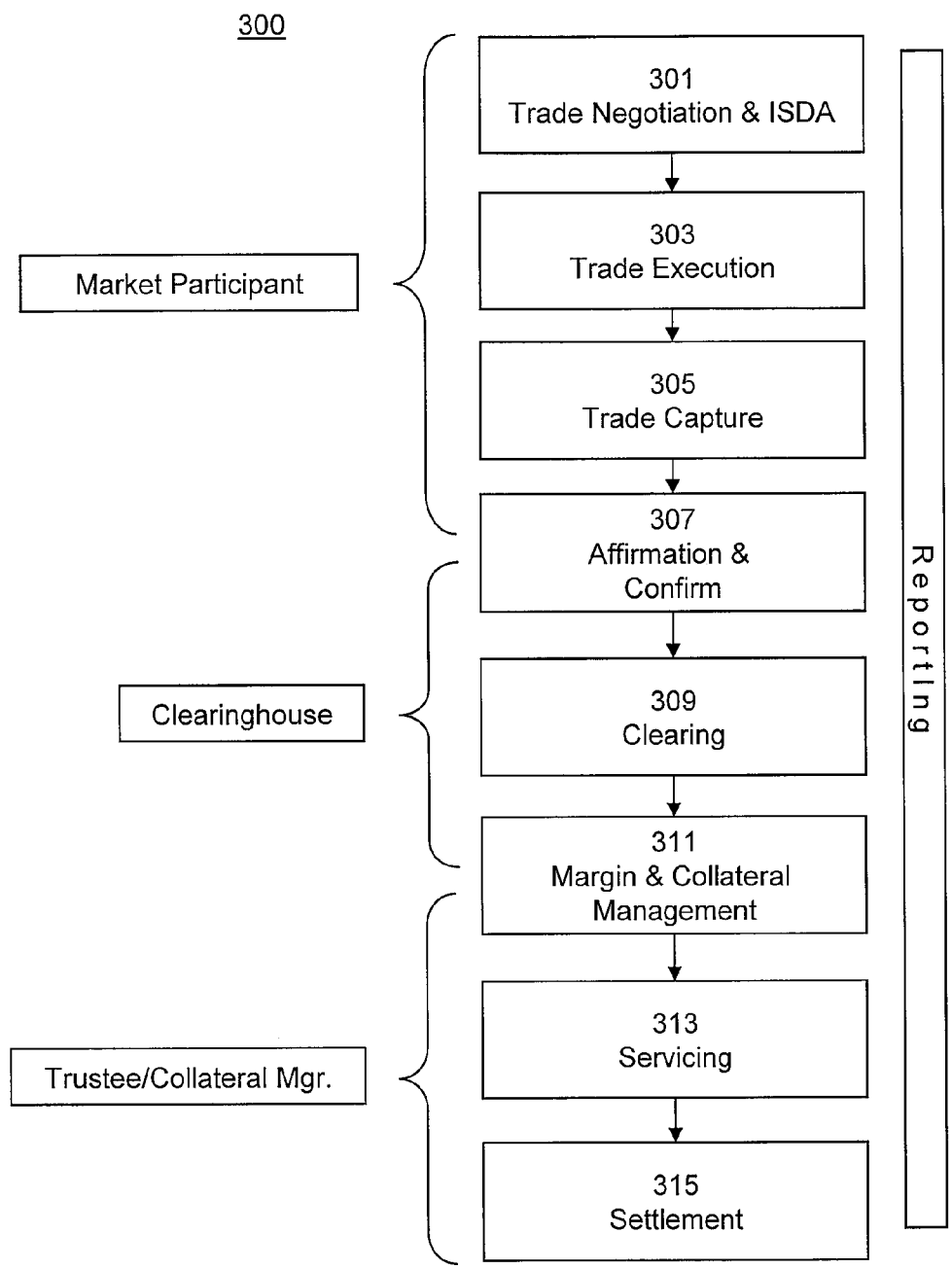
FIG. 3 illustrates process flow of a CDS transaction, according to various aspects of the invention.

FIG. 3 illustrates an example overview of the various stages 301-315 of a CDS transaction 300, wherein the roles of various entities are associated with each stage. For instance, market participants (i.e. CDS counterparties—buyers and sellers) may perform or otherwise be involved in negotiation functions among one another and may initiate International Swaps and Derivatives Association (ISDA) agreement completion (e.g., in an operation 301), trade execution (e.g., in an operation 303), trade capture (e.g., in an operation 305), and affirmation and confirmation stages (e.g., in an operation 307). In some instances, a CDS trustee/collateral manager may facilitate and/or otherwise be utilized by one or more market participants in the performance of one or more of these stages. In some embodiments, the CDS trustee/collateral manager capture, hold, and manage one or more documents associated with the CDS transaction such as, for example, the ISDA agreement, so as to capture and analyze information therefrom and provide access to such information. The trustee/manager can be uniquely positioned to work with regulators and market participants to put together a holistic solution that bring transparency and stability while supporting efficient functioning of the markets.

In some embodiments, one or more clearinghouse partners and/or a CDS trustee/manager may facilitate affirmation ("affirm") and confirmations ("confirm") of the CDS transaction (e.g., in operation 307), "clearing" of the transaction (e.g., in an operation 309), and margin and collateral management (e.g., in an operation 311). In typical CDS transactions, one or more of affirmation and confirmation of a transaction may be performed by one of the counterparties themselves, which may lead to undesirable delay in release of information relating to the transaction and/or other problems. As referred to herein, "clearing" of a transaction refers to a clearinghouse novating a trade and becoming a buyer to every seller and seller to every buyer using the clearinghouse.

Use of the systems and methods of the invention for operations 307-311 enables, inter alia, multi-lateral netting and matching; (including affirmation and confirmation); trade novation (e.g., step in and become counterparty to every trade; standardization of settlement processes; calculation of margin collateral requirements and mark-to-market positions (including initial and variation margin); enhancing transparency and reduce risk (including risk management—mark to market calculation and regulatory reporting); and/or enables other features.

Furthermore, in typical CDS transactions, the clearing stage may not occur at all. However, in CDS transactions utilizing the CDS trustee/collateral manager disclosed herein, affirmation and confirmation may be performed or facilitated by the un-biased CDS trustee/collateral manager and/or a clearinghouse partner. The relevant documents may be held by or managed by the system of the invention so as to capture and analyze information therein an provide access to this information. In this manner, information regarding CDS transactions are made available to the market in a timely manner. The use of a CDS trustee/collateral manager enables multi-lateral netting and matching; trade novation (wherein the trustee can step in and be a party to every trade); provides a standardized settlement process; calculates margin collateral requirements and market to market positions (both initial and variation to margin); as well as generally enhancing transparency and reducing risk. As illustrated in FIG. 3, the systems and methods disclosed herein enable various reporting throughout the CDS transaction.

In some embodiments, the CDS trustee/collateral manager enabled by the systems and methods disclosed herein may perform and/or facilitate margin and collateral management (e.g., in operation 311) as well as servicing (e.g., in an operation 313) and settlement (e.g., in an operation 315) of the CDS agreement. These services may enable payment processing (e.g., processing the periodic payments by the CDS buyer); management of collateral; transfer of cash for margining; comprehensive reporting (such as reporting to market participants and regulatory agencies, which may increase trade and position transparency); non-biased credit event monitoring and settlement; unwinding of positions (including notification and confirmation between counterparties of trades "signed away"); and custody of documents (such as, for example, ISDA agreements or other contracts or documents, which may be readily disclosed to one or more appropriate parties at one or more appropriate times). Use of the systems and methods disclosed herein for operations 311-315 enables, inter alia, collateral management and payment processing (including periodic payment processing, collateral management, and transfer of cash for margining); comprehensive view/reporting (including reporting to market participants and regulators and an increase trade and position transparency); non-biased credit event settlement process (including credit event monitoring and settlement work-out); Effective and efficient unwinding of positions (including trade "tear-up," notification and confirmation between counterparties of trades "signed-away"); document custody management; and other features. Furthermore, use of the systems and methods described herein enables reporting throughout the CDS transaction process. While certain parties are illustrated as being associated with certain operations shown in FIG. 3, the systems and methods described herein may be utilized to assist, facilitate, and/or perform any of the operations shown.

Figure 4:
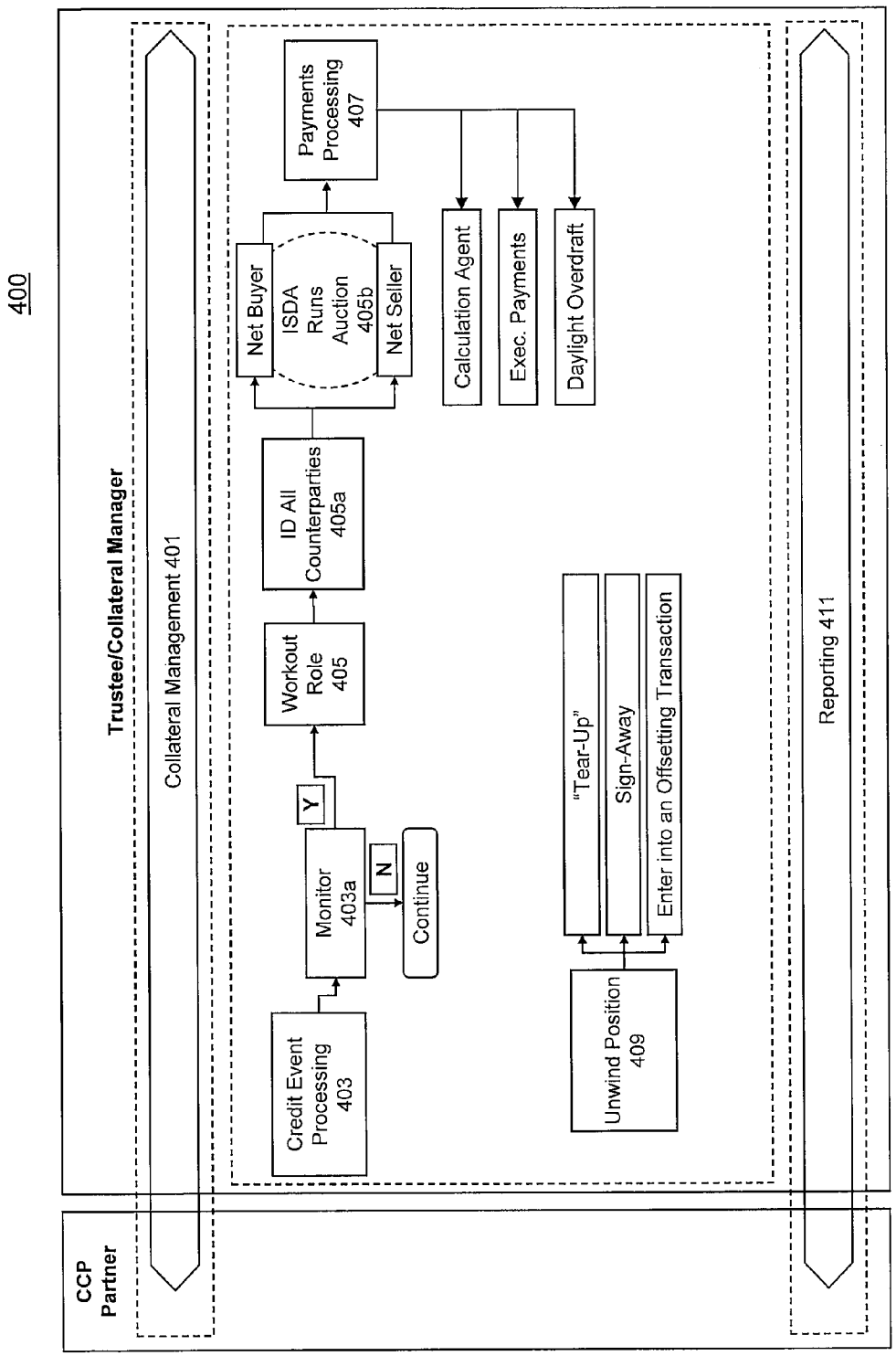
FIG. 4 illustrates a process flow for providing collateral management, credit event processing, payment processing, position unwinding, settlement and servicing, and reporting relating to a CDS transaction, according to various aspects of the invention.

FIG. 4 illustrates a flow diagram 400, which is an example of some of the functions of CDS trustee/collateral manager. In some implementations, these functions may include providing collateral management (see item 401), which is discussed in further detail herein. Other functions of the CDS trustee/collateral manager illustrated in FIG. 4 include providing servicing and settlement function such as, for example, credit event processing (see item 403), "workout" role functions (see item 405), payments processing (see item 407), unwinding functions (see item 409), and/or other functions. Furthermore, FIG. 4 illustrates that the CDS trustee/collateral manager also provides reporting functions (see item 411), which is discussed in further detail herein, throughout all phases of CDS transaction servicing and settlement.

In some instances, the credit event processing provided by the CDS trustee (see item 403) may include a defined standardized process that monitors for credit events (see item 403a—discussed in further detail herein). If monitoring is pursued, the CDS trustee may serve a "workout role" (see item 405) to work out the credit event. This work out role may include identifying all counterparties (see item 405a), monitoring the ISDA auction resulting from the event (see item 405b), and finally, facilitating payment to the appropriate parties (see item 407). Payment processing (see item 407), which is also further discussed herein, may include calculations related to payments between counterparties, facilitating and/or executing those payments, and providing daylight overdraft services. Unwinding CDS positions (see item 409), which is also further discussed herein, may include facilitating "tear up" functions, sign away or assignment procedures, and or facilitating a party entering into an offsetting position.

Figure 5:
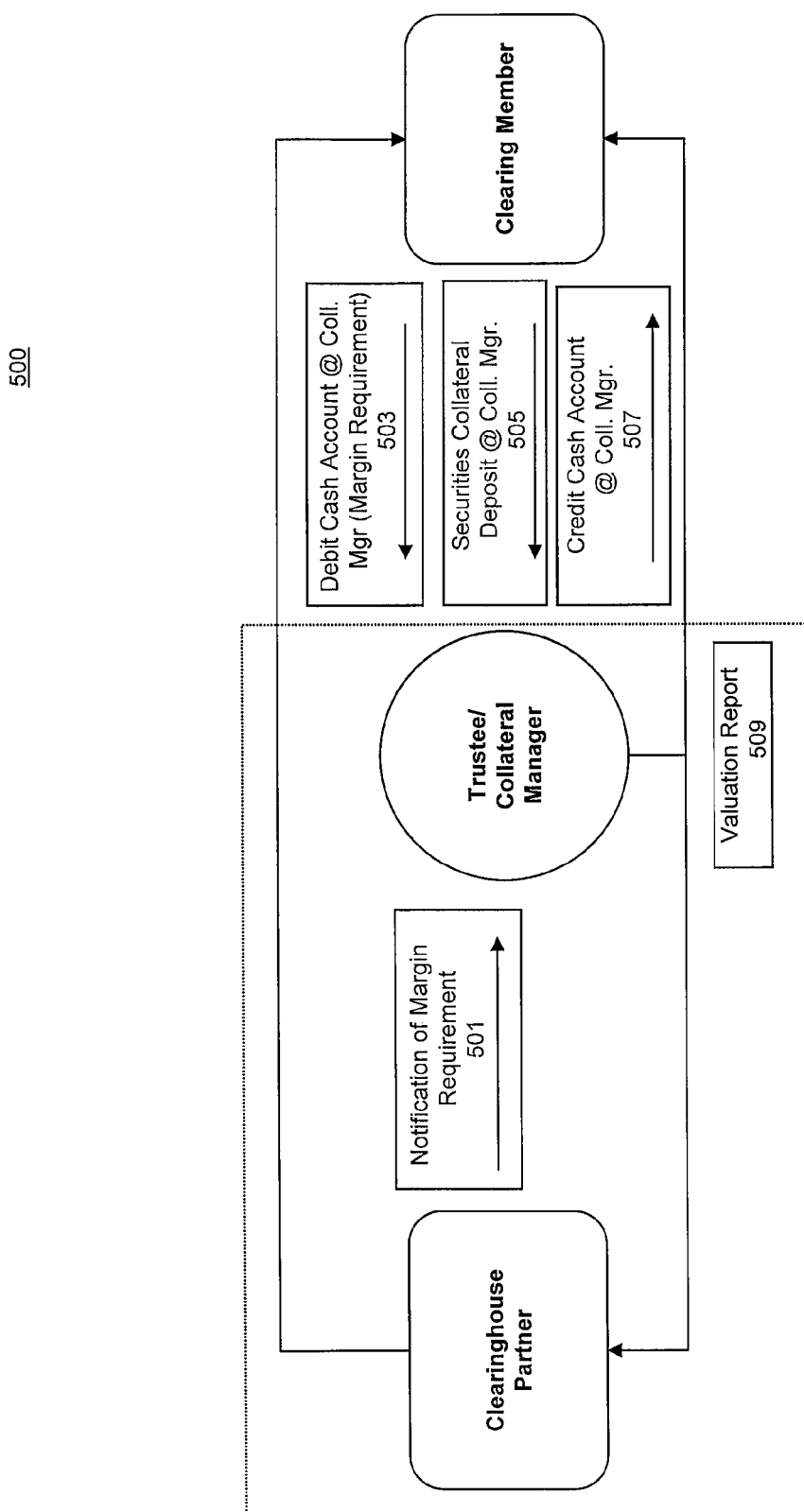
FIG. 5 illustrates a process flow for collateral management relating to a CDS transaction, according to various aspects of the invention.

As discussed herein, a collateral manager is provided that may be supported by the systems and methods disclosed herein. FIG. 5 illustrates a flow diagram 500, which is an example of a transaction flow for collateral management provided by a CDS trustee/collateral manager supported by the systems and methods disclosed herein. In some embodiments, collateral management features may utilize data communication network capabilities to populate clearinghouse databases regarding collateral for CDS transactions. As illustrated, the collateral manager operates between a clearinghouse partner and its clearinghouse members. In some embodiments, the collateral manager receives a notification of margin requirements in an operation 501. The collateral manager debits the appropriate accounts in an operation 503, enables the use of securities as collateral in an operation 505, credits any cash accounts (as necessary) in an operation 507, and provides valuation reporting in an operation 509, essentially locking down funds or requesting funds as required by the clearinghouse partner. This process does not currently exist using mechanisms (e.g., the collateral manager of the invention) that are un-conflicted or unbiased as it relates to CDS transactions that are being centrally cleared, which provide a number of advantages to clearinghouse partners, their clearing members and the market as a whole.

For example, typically, not all CDS trades are collateralized. When they are collateralized, cash is typically used as collateral. As spreads widen, to buffer counterparty risks, it is desirable that positions are properly collateralized. The CDS trustee/collateral manager disclosed herein provides a holistic solution that enables the use of securities as collateral, while optimizing the overall collateral management process. For example, currently, collateral is typically determined by the credit quality of a counterparty vs. the exposure by product level of the particular CDS transaction. However, the collateral management provided by the systems and methods disclosed herein provide a holistic derivatives margin and collateral management service. This provides stronger risk management because collateral is held by an un-conflicted third party (i.e., the CDS trustee/collateral manager). Additionally, whereas currently, derivative trade collateral is collected at a gross level as determined by dealers, the collateral management disclosed herein works with a clearinghouse (or the clearinghouse functions of the CDS trustee/collateral manager) to ensure adequate collateral and margin are maintained, which potentially provides the same bankruptcy relief clearing as the Federal Reserve and may extend. Securities Investor Protection Corporation (SIPC) relief to collateral management. Also, currently, collateral is not separated out on a product basis. However, use of the collateral management as disclosed herein provides net collateral settlement and clearing. Furthermore, currently, a credit support annex is used to determine collateral requirements (which are not standardized across counterparties). The collateral management provided disclosed herein enables optimization of overall collateral requirements of CDS transaction participants and expansion of the use of collateral from cash to securities. These features may lessen the burden on the Federal Reserve payment systems where most of the cash will eventually move. Furthermore, securities as collateral provides balance sheet relief and better liquidity management.

Figure 6:
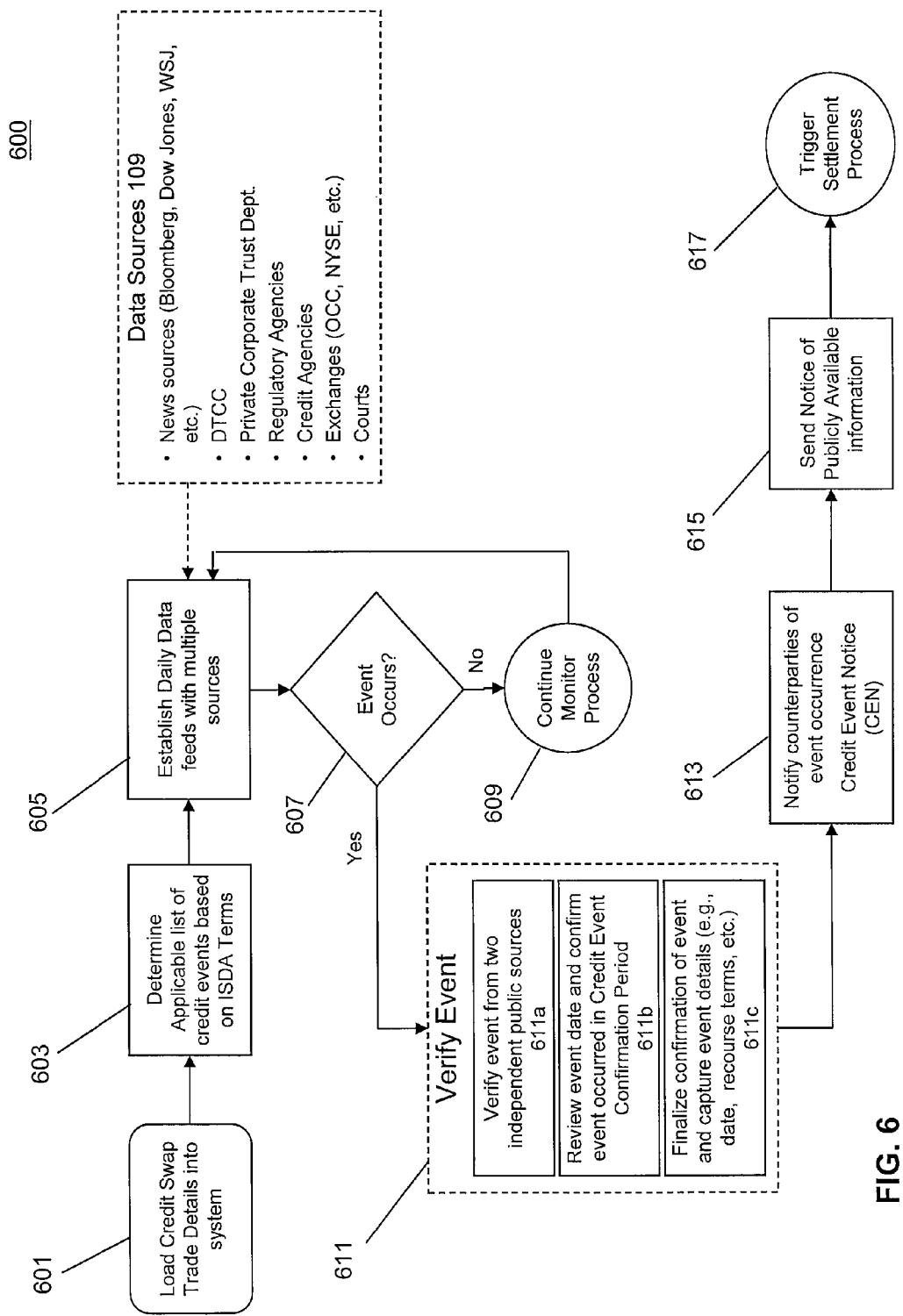
FIG. 6 illustrates a process for credit event monitoring and processing, according to various aspects of the invention.

As discussed herein, the CDS trustee/collateral manager may provide credit event monitoring and subsequent processing in conjunctions with one or more CDS transactions. FIG. 6 illustrates a process flow 600, which is an example of a process for credit event monitoring and processing provides by the CDS trustee of the invention. For example, in an operation 601, CDS transaction details may be loaded into a computer-implemented system (e.g., data storage components 105 or other element of system 100 of FIG. 1). This information may be provided by counterparties and/or a clearinghouse in what is sometimes termed a "swap drop."

For example, application 101 may receive this information from counterparties 113 or clearinghouse partners 111 through network 107. In an operation 603, an applicable list of credit events may be determined. In some embodiments, this list may be determined using ISDA terms or other guidelines, but in any event may be defined in the ISDA agreement between the counterparties. In some embodiments, credit events may include one or more of bankruptcy, failure to pay, default, restructuring, repudiation, moratorium, credit downgrades, and/or other events. These credit events monitored for and processed are that of the "Reference Entity or Obligation" as per the CDS agreement, that is, the instrument or entity associated therewith (obligor) that upon default, trigger payment from the CDS seller to the CDS buyer (i.e., settlement). There are cases where the buyer or seller in one agreement might be a reference entity in another and in this case the CDS trustee would monitor credit events for the same.

As the market moves towards the utilization of a central clearinghouse, in general, the credit of a counterparty would be monitored by the clearinghouse—however, the CDS trustee can still monitor for reference entity credit events. In an operation 605, data feeds with multiple data sources that provide information useful in determining the occurrence of a credit event may be established. For example, news sources, the Depository Trust & Clearing Corporation (DTCC), private corporate trust entities (including a corporate trust entity operated by or for the benefit of the CDS trustee), regulatory agencies, credit agencies, securities exchanges, courts, market partners, and/or other entities may be used to supply data for determining the occurrence of a credit event. With reference to FIG. 1, data feeds 109 may supply (or be used to extract) data regarding credit events to application 101 (which may then be stored in data storage components 105) using network 107. In some embodiments, data regarding credit events may be gathered using other sources and via other methods.

In an operation 607, it may be determined, using the data gathered in operation 605, whether a credit event has occurred. This determination is made by the CDS trustee as disclosed herein and may be accomplished using logic from the one or more modules 103-103n of application 101. By using the unbiased third party (i.e., the CDS trustee), to make this determination, the pitfalls of traditional credit event monitoring (which is typically done by the counterparties themselves) are avoided, creating further transparency and efficiency. If it is determined that a credit event has not occurred, process 600 proceeds to operation 609, wherein monitoring for credit events continues. If it is determined that a credit even has occurred, process 600 proceeds to an operation 611, wherein the event is verified. In some embodiments, the verification of operation 611 may be an automated process. Verification may include utilizing two or more independent public sources of information to verify accuracy of data and/or determinations derived from that data (see operation 611a), reviewing the event timeline (e.g., pertinent dates), confirming that the credit event occurred in a "credit event confirmation period" (see operation 611b), finalizing confirmation of the credit event and capturing event details (e.g., data recourse terms, or other details) (see operation 611c), and/or performing other verification operations.

In an operation 613, counterparties may then be notified of the occurrence of the credit event. For example, counterparties 113 of FIG. 1 maybe notified via a communication from application 101 across network 107. Other methods of providing notification may be utilized. In an operation 615, a notice of publically available information may be sent, which may include notice that a default of the instrument underlying the CDS has occurred. For example, application 101 of FIG. 1 may provide this notice to market participants 115 or other entities using network 107. Other methods of providing notice may also be used. In an operation 617, the settlement process (discussed in further detail herein) may be triggered.

The above credit event monitoring and processing features of the CDS trustee (along with other features disclosed herein), inter alia, relieve the burden of credit event monitoring, determination, and notification from the counterparties themselves and provide an unbiased third party perspective to the credit event monitoring process, which improves transparency and market information. Currently, CDS buyers are responsible for capturing credit event news and often utilize third party vendors. As discussed herein, the CDS trustee establishes direct data feeds with news sources, rating agencies, government agencies, courts, and/or other sources, which enables the trustee to leverage their scale and operational expertise to capture real-time information from multiple sources. Also, currently a CDS buyer makes a determination of the occurrence of a CDS event (which is typically a "back office" determination that is subject to inherent bias) and sends notification of the credit event to the CDS seller and publically available information to the market, whereas the CDS trustee disclosed herein may independently verify credit events with a minimum of 2 public sources (or other number/source type) and sends event notifications (including one way communication of event confirmation to trade counterparties). These, and other features, of the CDS trustee disclosed herein may eliminate the need for counterparty matching and verification of credit events, provide faster recognition of events, reduce operational burden of counterparties and bilateral communication among counterparties by instituting one way notification from CDS trustees to counterparties, and provide independent and unconflicted credit event capture.

As discussed herein, the CDS trustee/collateral manager disclosed herein may provide payment processing services. CDS transactions are characterized by the periodic payment by the CDS buyer to the CDS seller along with posting initial and variation margin to appropriate counterparties (i.e., trade counterparty, clearinghouse partners). Also involved are default event settlement payments which may be facilitated by the CDS trustee disclosed herein.

Figure 7:
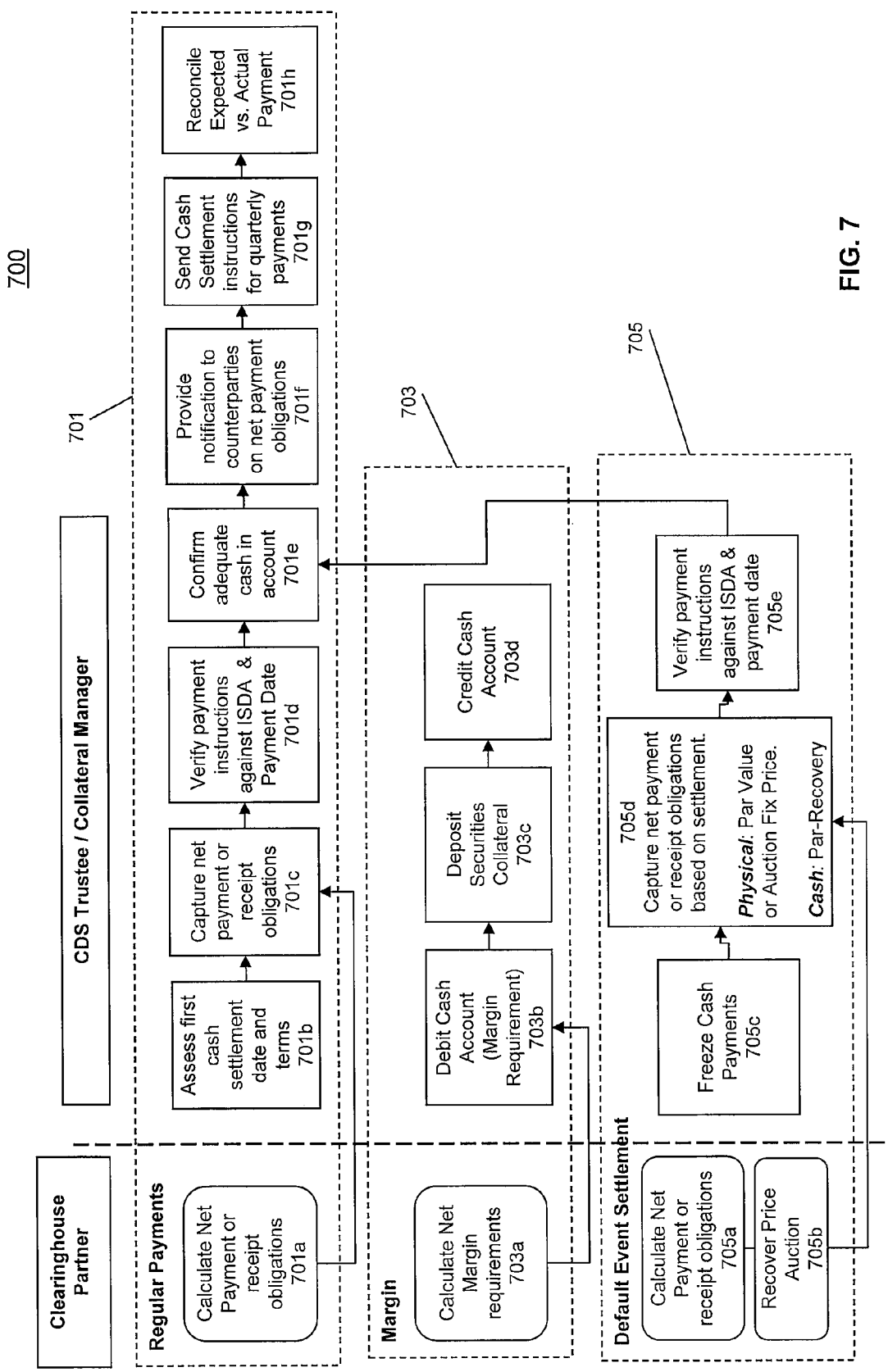
FIG. 7 illustrates a process flow for payment processing relating to CDS transactions, according to various aspects of the invention.

FIG. 7 illustrates process flow 700, which is an example of processes for payment processing features of the CDS trustee/collateral manager disclosed herein. Process 701 illustrates an example of a process for processing regular payments from the CDS buyer to the CDS seller ("premium payments"), wherein a clearinghouse partner or CDS trustee/collateral manager may, in an operation 701a, calculate net payment and/or receipt obligations. Additionally, the CDS trustee may, in an operation 701b, assess first cash settlement date and terms. The net payment and/or receipt obligations and the first cash settlement date and terms may be used by the CDS trustee to capture net payment or receipt obligations in an operation 701c. The CDS trustee may then proceed to verify payment instructions against the ISDA agreement and the payment date in an operation 701d, confirm adequate cash in account in an operation 701e, provide notification to counterparties on net payment obligations in an operation 701f, send cash settlement instructions for quarterly (or other periodic) payments 701g, reconcile expected vs. actual payment amounts in an operation 701h, and/or perform other actions.

Process 703 illustrates an example of a process for posting initial or variation margin to appropriate counterparties using a CDS trustee of the invention, wherein a clearinghouse partner or CDS trustee may calculate margin net requirements in an operation 703a. The CDS trustee may then debit the appropriate cash account (margin requirement) in an operation 703b, deposit securities collateral in an operation 703c, credit the appropriate cash account in an operation 703d, and/or perform other functions.

Process 705 illustrates an example of a process for making default settlement payments in conjunction with a CDS transaction using a CDS trustee as disclosed herein, wherein a clearinghouse partner of the CDS trustee may calculate net payment and/or receipt obligations in an operation 705a and perform recover price auction functions in an operation 705b. Additionally, the CDS trustee may freeze cash payments from the CDS buyer to the CDS seller or other payments in an operation 705c, and utilize the net payment and/or receipt obligations and the recover price auction details to capture net payment or receipt obligations based on settlement (wherein physical assets are assessed a par value or auction fix price and cash is assessed a par recovery value) in an operation 705d. Furthermore, the CDS trustee may verify payment instructions against the ISDA agreement and payment date in an operation 705e and perform other transaction operations such as, confirming adequate cash in the account of the payer (see operation 701e), provide notification to the counterparties on net payment obligations (see operation 701f), send cash settlement instructions for payment (see operation 701g), and reconciling expected vs. actual payment amounts (see operation 701h).

Currently, the counterparties themselves calculate periodic payments from the CDS buyer to the CDS seller and the CDS buyer is required to see that these payments are made in a timely manner. Furthermore, the counterparties themselves currently confirm payment and receipt obligations. Conversely, the systems and methods of the invention provide a CDS trustee that receives single net payment obligations from a clearinghouse partner or other entity and processes accordingly. Furthermore, trades not cleared by a clearinghouse partner may be netted by the CDS trustee. The CDS trustee may also manage debit and credit cash transfer instructions, confirm margin requirements and payment obligations, and/or perform other actions. These features provided by the CDS trustee disclosed herein enable leveraging of payment netting and matching by clearinghouse partners, eliminates the need for matching and confirmation of payment obligations, allows market participants to leverage existing relationships with the CDS trustee and/or may provide other advantages. Furthermore, netting by the CDS trustee may eliminate the need for making multiple payments.

As discussed herein, the CDS trustee/collateral manager disclosed herein may facilitate unwinding of a CDS transaction. The unwinding of a CDS transaction by a counterparty can be accomplished in one of three primary methods: tearing up, assignment, or taking an offsetting position. Typically, the unwinding of CDS transactions tend to be inefficient and can result in a significant number of backlogs and unsigned trades because the agreements go into "back office" channels once the agreement is entered into. Furthermore, the amount of paperwork involved in unwinding CDS transactions can be cumbersome to counterparties. The CDS trustee brings the processing out of the "back office" channels and may facilitate the unwind process by facilitating the cash payment process between counterparties, notifying and confirming unwinding positions among counterparties, obtaining proper sign-off and compliance in the event of an assignment, notification of any applicable clearinghouse partners, and/or performing other functions. These and other features provided by the CDS trustee disclosed herein can reduce the backlog of unsigned trades, ensure that counterparties, are properly notified of unwinding positions, ensure timely and orderly processing of cash payments between counterparties, provide a central point of reference at which to update records, and/or provide other advantages.

Figure 8:
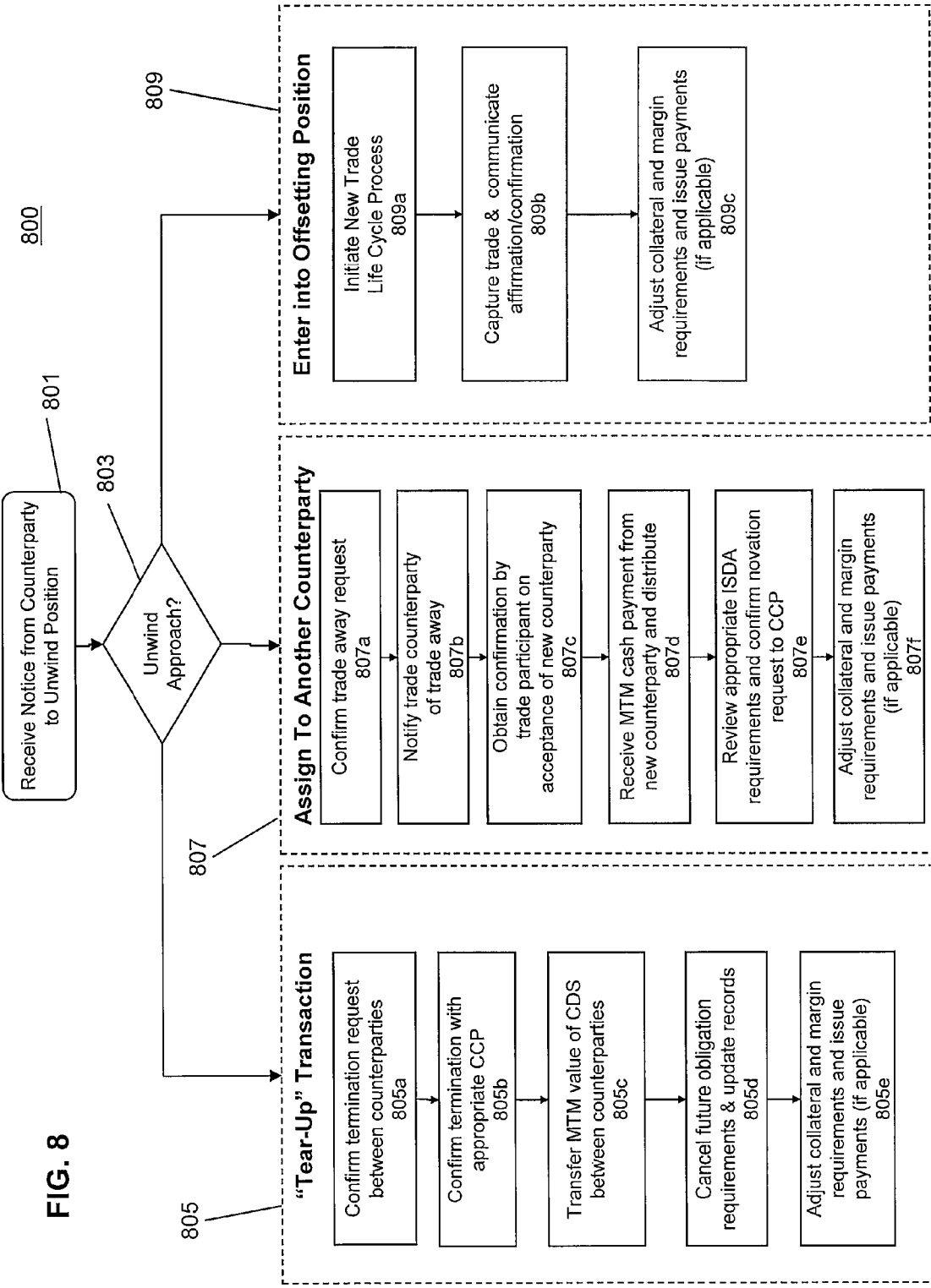
FIG. 8 illustrates a process for unwinding CDS transactions, according to various aspects of the invention.

FIG. 8 illustrates a process flow 800, which provides examples of operations that facilitate unwinding of a CDS transaction using the CDS trustee as disclosed herein. In an operation 801, the CDS trustee may receive notice (e.g., via a communication across network 107 or otherwise) from a counterparty to a CDS transaction that the transaction is to be unwound. In an operation 803, it may be decided (e.g., via a module 103 of application 101 or otherwise decided) what approach to utilize for the unwinding of the CDS transaction. The illustrated embodiments may include process 805, 807, or 809, however, other processes, operations, or methods may be implemented.

Process 805 is an example of "tearing up" the transaction, wherein the CDS trustee may confirm the termination request between the counterparties in an operation 805a, confirm the termination with the appropriate clearinghouse partner in an operation 805b, transfer the market to market (MTM) value of the CDS between the counterparties in an operation 805c, cancel any future obligation requirements and update the appropriate records in an operation 805d, adjust collateral and margin requirements and issue any applicable payments in an operation 805e, and/or perform other actions.

Process 807 is an example of an assignment of the CDS transaction to another counterparty. The existing counterparties must agree to this assignment or "trade away." The CDS trustee ensures compliance with all applicable rules and generally facilitates the trade away by confirming the trade away request in an operation 807a, notifying the counterparties of the trade away in an operation 807b, obtaining confirmation by the trade participant of the acceptance of the new counterparty in an operation 807c, receiving MTM cash payment from the new counterparty and distributing it accordingly in an operation 807d, reviewing appropriate ISDA requirements and confirming the novation request to any applicable clearinghouse partner in an operation 807e, adjusting the collateral and margin requirements and issuing any applicable payments in an operation 807f, and/or performing other actions.

Process 809 is an example of a party to a CDS transaction entering into an offsetting position from the original CDS transaction. For example, if a party originally took a "long" position on an instrument or entity, that same party may offset that position by subsequently taking a "short" position on the same instrument or entity. In the example of process 809, the CDS trustee may initiate the new trade life cycle process in an operation 809a, capture trade and communication affirmation/confirmation in an operation 809b, adjust collateral and margin requirements and issue any applicable issue payments in an operation 809c, and/or perform other actions.

As discussed above, the CDS trustee/collateral manager disclosed herein may enable and/or facilitate settlement of the CDS transaction in the event of a credit default. In the event that a credit default occurs, the orderly settlement of a CDS transaction is critical to the counterparties. It may be necessary for the settlement of the CDS transaction to be in line with the terms and conditions outlined in the transaction's ISDA agreement. In some embodiments, settlement can be either physical or cash based.

Currently, CDS counterparties agree on form of settlement in the initial agreement. Additionally, the counterparties typically must confirm notional value and delivery date obligations. Also, CDS buyers holding reference entity obligations (e.g., debt) must engage in price fixing auctions (which typically include a 30 day schedule and involve additional "back office" procedures to ensure confirmation) and must receive requests for physical settlement from auction bidders. Furthermore, the settlement process is currently a bilateral process between counterparties to settle cash and obligations directly. However, the CDS trustee disclosed herein provides an independent trustee to initiate the settlement process between counterparties, obtain option protocol terms and represent counterparties (if applicable), handle physical settlement requests by auction bidders on behalf of counterparties, and manage the transfer of cash and securities for settlement. These actions by the CDS trustee provides unilateral execution and settlement between counterparties, orderly and timely settlement, as well as an independent trustee to engage in any auction processes and confirm the results.

Figure 9:
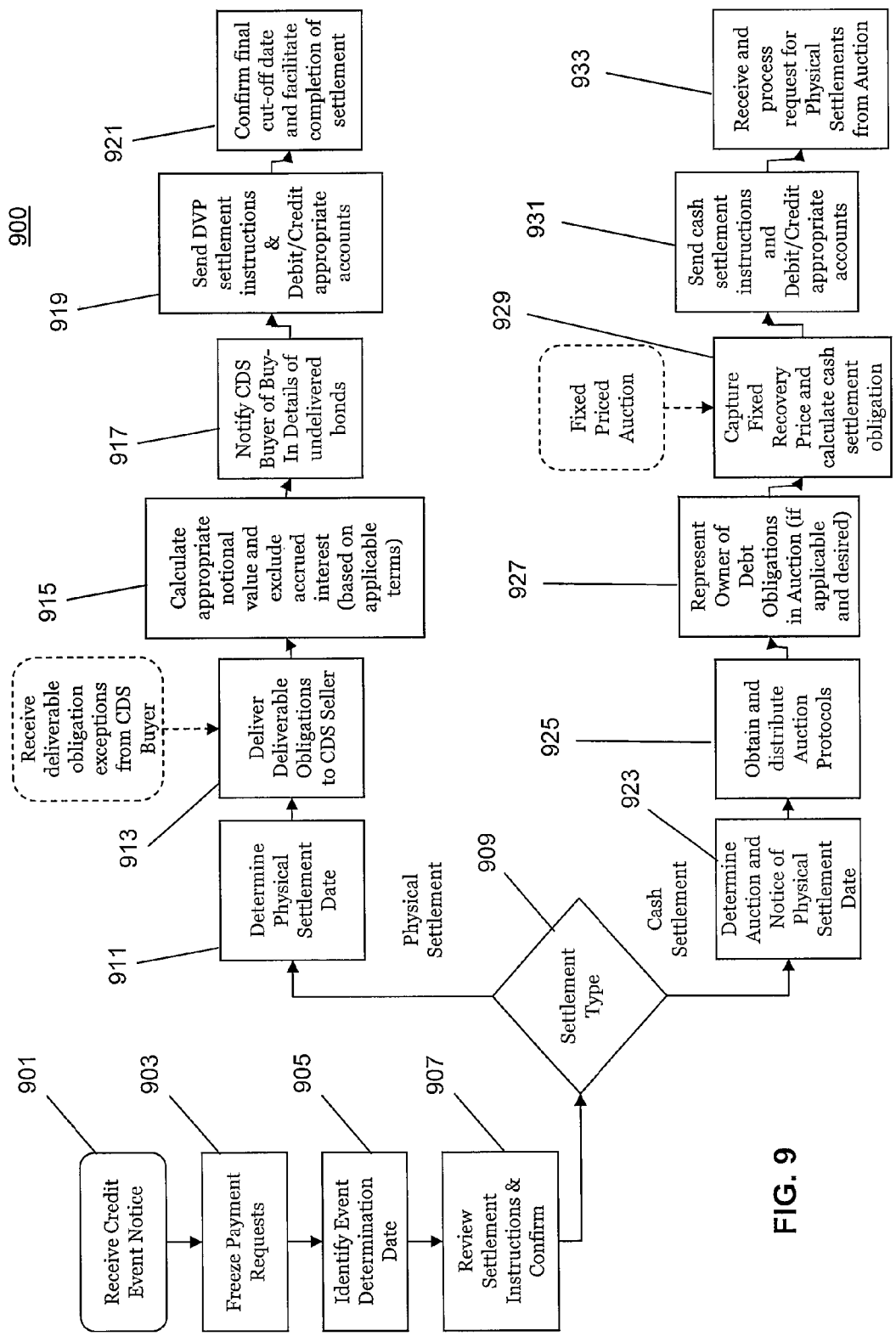
FIG. 9 illustrates a process for providing settlement of a CDS transaction, according to various aspects of the invention.

FIG. 9 illustrates a process 900, which is an example of a process for settlement of a CDS trade in the event of a credit default. Process 900 includes an operation 901 wherein the CDS trustee disclosed herein receives a credit event notice (which maybe associated with the triggering event 617 of process 600). In an operation 903, the CDS trustee freezes payment requests. In an operation 905, the CDS trustee identifies the event determination date. In an operation 907, the CDS trustee then reviews the settlement instructions (e.g., per the terms set forth by the counterparties) and confirms the settlement. In an operation 909, the CDS trustee determines whether the settlement is a physical settlement or a cash settlement.

If it is determined to be a physical settlement, the CDS trustee determines, in an operation 911, the physical settlement date. In an operation 913, the CDS trustee may then receive deliverable obligation exceptions from the CDS buyer and deliver the deliverable obligations to the CDS seller. In an operation 915, the CDS trustee then calculates the appropriate notional value and excludes accrued interest (based on applicable terms). In an operation 917, the CDS trustee may notify the CDS buyer of buy-in details of undelivered bonds. In an operation 919, the CDS trustee may then send delivery versus payment (DVP) settlement instructions and debit/credit appropriate accounts. In an operation 921, the CDS trustee confirms the final cutoff date and facilitates the completion of settlement.

If, in operation 909, the settlement is determined to be a cash settlement, the CDS trustee may determine auction and notice of physical settlement date in an operation 923. In an operation 925, the CDS trustee may obtain and distribute auction protocols. In an operation 927, the CDS trustee may then represent the owner of debt obligations in the auction (if applicable and desired). In an operation 929, the CDS trustee may utilize information from a fixed price auction, capture fixed price recovery and calculate the cash settlement obligation. In an operation 931, the CDS trustee may send cash settlement instructions and debit/credit the appropriate accounts. In an operation 933, the CDS trustee may receive and process a request for physical settlements from auction. Other actions may be performed by the systems disclosed herein in association with settlement facilitation.

As discussed herein, the systems and methods disclosed herein may provide reporting features associated with CDS transactions. Effective and accurate reporting may be necessary to allow CDS counterparties to accurately understand market exposure and calculate risk. In addition, reporting may provide the necessary transparency to meet any existing new regulatory requirements. Currently, individual counterparties generate internal reports and compile data from various and disparate systems. Furthermore, reports and documents are transmitted between counterparties in a bilateral manner across various communication mechanisms. The systems and methods of the invention provide market-to-market (MTM) data on trade positions to counterparties, may produce exposure and risk reports and meet any new regulatory requirements, and may produce reports that provide transparency along the value chain of a CDS transaction. These features provide independent and unbiased reports of data, efficient and timely reporting of data, standardized reports and information, reduce the need for reconciliation of data between counterparties, and generally increase transparency in the market.

Figure 10:
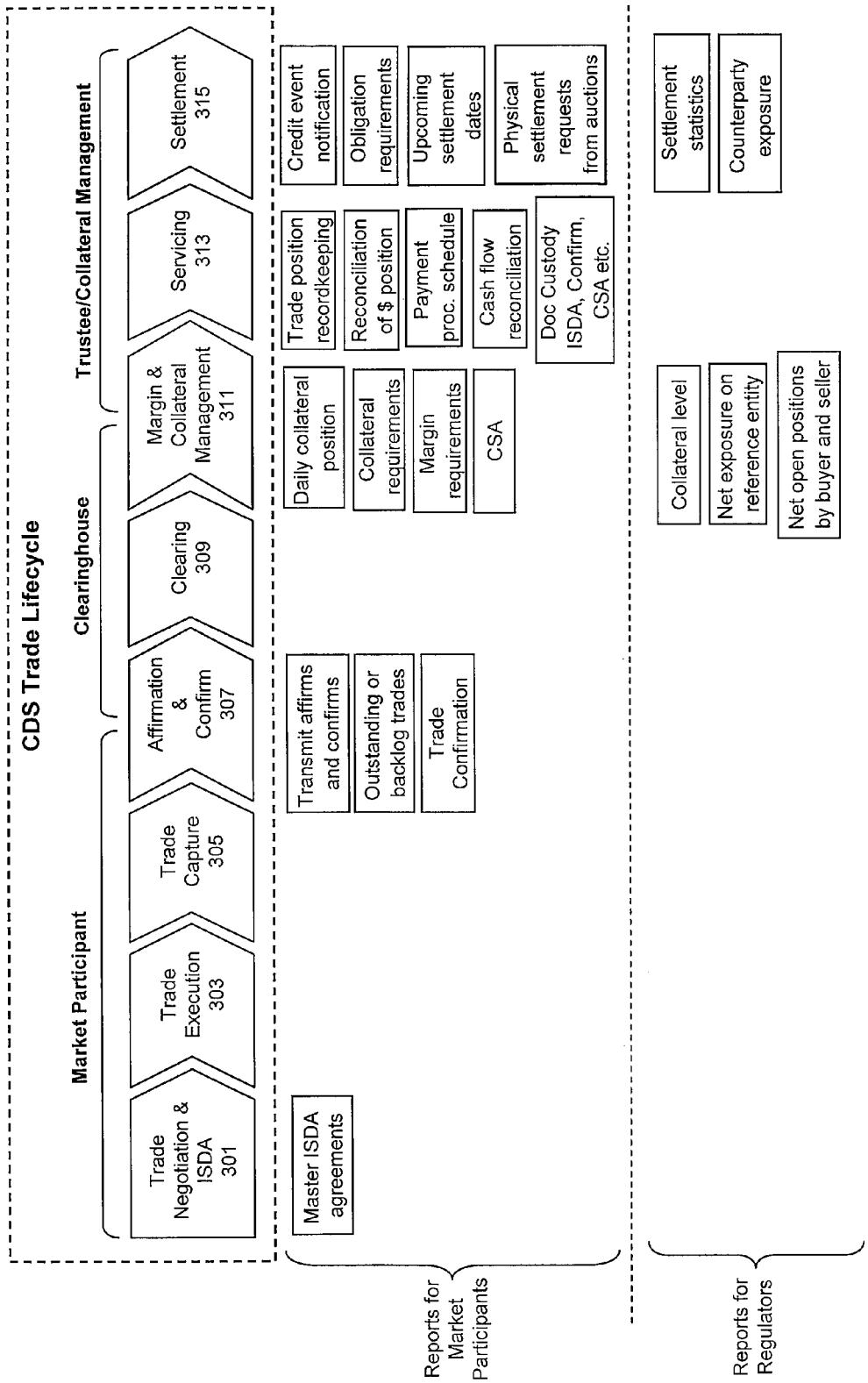
FIG. 10 illustrates a process flow of a CDS transaction and associated reports, according to various aspects of the invention.

FIG. 10 illustrates an example of the types of reporting enabled by the systems and methods disclosed herein. For example, relating to the trade negotiation and ISDA agreement phase (see operation 301) of a CDS transaction, the ISDA agreement may be made available to market participants. Currently, ISDA master agreements are difficult or impossible to access. The systems and methods disclosed herein may enable capture, storage, and management of these and other documents and provide access to market participants (e.g., via network 107). In another instance, relating to the affirmation and confirmation phase (see operation 307), the systems and methods disclosed herein may transmit or otherwise provide reports regarding or access to "affirm," "confirms," outstanding or backlogged CDS transactions, and generally provide confirmation of what participants are involved in what CDS transactions. In relation to margin and collateral management (see operation 311), the systems and methods disclosed herein may provide information or reports for market participants regarding daily collateral positions, collateral requirements, margin requirements, CSA (Credit Support Agreement) requirements, and/or other reports or information. In relation to margin an collateral management (see operation 311), the systems and methods disclosed herein may provide information or reports for regulators regarding collateral level, net exposure on a reference entity, net open positions by buyer and seller, and/or other reports or information. In relation to the servicing phase of CDS transactions (see operation 313), the systems and methods disclosed herein may provide reports or other information for market participants relating to trade position recordkeeping, reconciliation of cash position, payment processing schedules, cash flow reconciliation, document custody (ISDA, confirm, CSA, etc.), and/or other reports or information. In relation to settlement procedures (see operation 315), the systems and methods disclosed hereon may provide reports or information for market participants regarding credit event notifications, obligation requirements, upcoming settlement dates, physical settlement requests from auctions, and/or other reports or information. In relation to settlement procedures (see operation 315), the systems and methods disclosed herein may provide reports or information for regulators regarding settlement statistics, counterparty exposure, and/or other reports or information. Other reports relating to other information may also be generated and provided. In some embodiments, one or more of the reports or information discussed above may be provided or accessible to select parties only, depending on the specific information contained therein and the nature thereof.

The reporting capabilities of the system of the invention (e.g., system 100) may extend solutions currently in the market. For example, decision by the Depository Trust & Clearing Corporation (DTCC) to provide weekly reporting on notional and net CDS exposure may help provide greater transparency to the market. However, CDS buyers, sellers, and regulators may need greater insight to more effectively manage risk.

For example, the DTCC reports may include cross reference gross notional & contracts between buyer and seller type1, which may include, for example, CDS between Dealer Buyers and Non-Dealer sellers had gross notional. Another DTCC report may include gross notional and contracts by single name Reference Entity Types (e.g., Corporate Oil & Gas) by Buyer Type or Seller Type, which may include, for example, CDS on Corporate Financials bought by Dealers is $3.1 T gross notional. Still other DTCC reports may include top 1000 Reference Entities (Gross and Net Notional), which may include, for example, On-the-Run CDSs for ABX-.HE.A.07 Sold by Dealers is $1.7 MM gross notional. A DTCC report may also include all Indices, sub-Indices and index tranches (Gross and Net Notional), which may include, for example, gross Notional CDS on ABX.HE.A.06. is $30.1 B. Another example of a DTCC report may include aggregate single-name contracts by year of scheduled termination date, which may include, for example, gross notional CDS with 2010 term date is $1.4 T.

However, the DTCC or other required reports may not provide adequate transparency. Therefore, the system of the invention may enable further reports and information access such as, for example, gross notional and net exposure for each counterparty (e.g., total notional and net exposure of "AIG"), individual buyers and sellers of contracts (e.g., "MS" sold a certain notional amount of CDS on a reference entity), percent of notional exposure for a particular reference entity (e.g., "GS 's" notional amount of exposure to a reference entity which is a certain percent of total notional), catalog of counterparties and individual contracts for the purposes of unwinding trades in the event of counterparty default (e.g., "GS" bought a CDS from "AIG" and "AIG" sold an offsetting position to "MS"), net collateral and margin posted by counterparties vs. exposure (e.g., net collateral "GS" has posted vs. their net CDS exposure), gross notional and net exposure by individual counterparties and contracts by termination (e.g., "MS" gross notional CDS value in a particular year of termination), and/or other reports.

Figure 11:
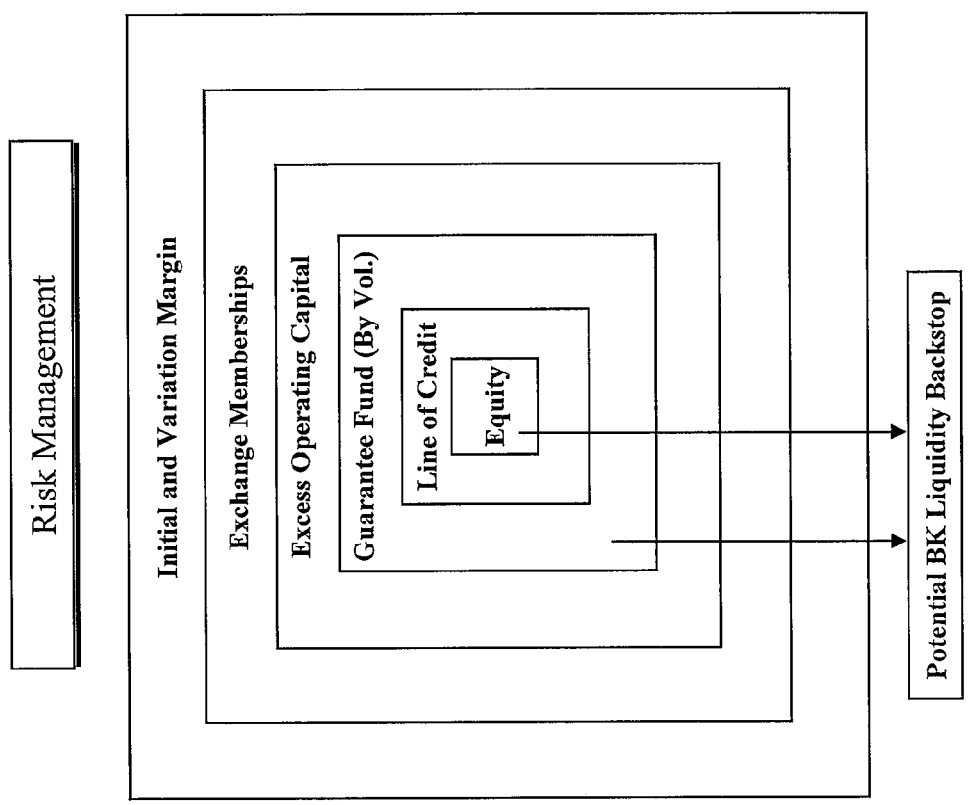
FIG. 11 illustrates multiple market strata throughout which the systems and methods of the invention provide risk management and other benefits, according to various aspects of the invention.

As discussed herein, there is no system or entity in the market today that integrates across all aspects of CDS transactions as do the systems and methods disclosed herein. Furthermore, as illustrated in FIG. 11, the CDS trustee/collateral manager of the invention provides an unbiased and holistic perspective that enables risk management across multiple market strata. In some instances, use of the systems and methods disclosed herein provides a central counterparty to every trade (i.e., buyer to every seller and seller to every buyer) and as such guarantees that every trader will honor their obligations. The systems and methods disclosed herein marks to market positions on a daily basis and nets out obligations to zero. In some instances, the system maintains no futures market positions, the riskiness may be less than it may appear as the system is hedged by holding the opposing side to every trade. Accordingly, regardless of the moment in spreads, the capital of the system remains the same. Furthermore, the system's default exposure extends to defaults by a clearing member and to the extent that dramatic single day changes in prices adversely impact the capability to meet margin call using all lines of defense.

The term "CDS transaction" is intended to encompass the meaning of the term "CDS trade" and generally refers to any credit default swap agreement between two counterparties. As discussed herein, as the systems and methods disclosed herein may not only interact with outside clearinghouse partners but may also provide the services of a clearinghouse in CDS transactions, any operation, role, or other feature or function described herein as being performed by a clearinghouse partner may be enabled and/or performed by the CDS trustee/collateral manager and associated systems and methods.

In some embodiments, the invention may include one or more computer-implemented methods whereupon one or more of the features or functions described herein, including the operations and processes described herein, are performed. The features and functions of such methods may be combined in various orders. In some embodiments, not all of the features and functions described herein may be performed in a given method or process. In some embodiments, additional features or functions may be performed in addition to those described herein. The operations, methods, or processes described herein may be tied to, supported by, and/or otherwise enabled by the computer systems described herein (e.g., system 100), including hardware and software components, or other computer systems. In some embodiments, the operations, methods or processes described herein may be tied to, supported by, distributed across, and/or otherwise enabled by two or more computing devices. Furthermore, in some embodiments, the invention may include tangible memory having instructions thereupon that may instruct the one or more processors of the one or more computing devices of the systems described herein or other systems to execute one or more of the operations, processes, methods, features and/or functions described herein. Furthermore, in some embodiments, the invention may include computer program products, computer-readable media, or other physical media (such as, for example, floppy disks, hard disks, magnetic media, compact discs, digital video discs, flash memory, memory sticks, electrically programmable read only memory [EPROM], flash electrically programmable read only memory [FEPROM], or other volatile or non-volatile memory) on which instructions reside that may instruct the one or more processors of the one or more computing devices of the systems described herein or other systems to execute one or more of the operations, processes, methods, features and/or functions described herein.

In some embodiments, the systems and methods disclosed herein may be further implemented using the following: the Federal Reserve Bank of New York (FRB NY) or other regulatory entity may mandates registering with a central 'Trustee' (e.g., the CDS trustee of the present invention) for existing and new ISDA master agreements. ISDA implements this mandate as a standard requirement. By assuming a central "trustee" role in swaps agreements (starting with CDS's) the CDS trustee/collateral manager disclosed herein can provide a current and comprehensive view into counterparty positions and exposures including facilitating an orderly non-biased credit event settlement process. A central trustee can also address CDS's holistically, i.e. single names, index based, etc. Furthermore, in default situations, the CDS trustee/collateral manager disclosed herein can work with the FRB NY (or other entity) to unwind positions. Services provided by the CDS trustee/collateral manager disclosed herein may include collateral management, payment processing, credit event monitoring, and facilitating the workout process. In some instances, the 'trustee' role might be considered as competitive to that of a clearinghouse. However, since trades may not be novated as a trustee, there may be an opportunity to participate with a clearinghouse, the FRB NY (or other entity), or both in effecting unwinds. In some embodiments, the strategic benefits to an organization or entity providing the CDS trustee/collateral manager of the invention may include: net new fee income, potential Improved contributions to margin, potential offset/hedge to other "trustee" programs, extend scale and market position of related current product offerings, develop access and capabilities to a new market, product leadership, provides a unique competitive differentiator vs. other entities, and/or other benefits. In some embodiments, the tactical benefits to an organization providing the CDS trustee/collateral manager disclosed herein may include: product synergies across: margin management products, clearing, collateral management; scale enhances growth opportunities and capability to invest and compete; cross-sell existing customer base; and/or other benefits.

While particular embodiments of the invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from the specification and practice of the invention disclosed herein.

What is claimed is:

1. A computer-implemented system for facilitating and monitoring credit default swap (CDS) transactions, comprising:
   one or more data storage devices; and
   one or more computer processing devices configured to:
      receive and store in the one or more data storage devices, information relating to a plurality of CDS transactions, including, for each CDS transaction: an identity of a CDS buyer, an identity of a CDS seller, an identity of a reference entity, one or more financial terms relating to obligations and responsibilities of the CDS buyer and the CDS seller, and one or more credit event terms used for determining the occurrence of a credit event with respect to the CDS transaction,
      determine, for each unique entity reflected in the stored information, a net position and exposure of that entity in a marketplace of CDS transactions,
      receive information relating to a reference entity of a CDS transaction from the plurality of CDS transactions,
      confirm, using information from at least two public data sources, an accuracy of the received information relating to the reference entity,
      determine, using the information relating to the reference entity and the one or more credit event terms, if a credit event has occurred,
      notify the CDS buyer of CDS transaction and the CDS seller of the CDS transaction that the credit event has occurred.

2. The system of claim 1, wherein the stored information includes one or more settlement terms relating to settlement of the CDS transaction in the event of a credit default.

3. The system of claim 2, wherein the one or more computer processing devices are further configured to perform one or more settlement actions according to the one or more settlement terms, wherein the one or more settlement actions include at least a payment from the CDS seller to the CDS buyer.

4. The system of claim 3, wherein the one or more settlement terms include physical settlement terms.

5. The system of claim 3, wherein the one or more settlement terms include cash settlement terms.

6. The system of claim 1, wherein the one or more computer processing devices are further configured to:
   receive notice from one of a CDS buyer or a CDS seller of at least one of the plurality of CDS transactions that the at least one CDS transaction is to be unwound,
   determine an unwinding process from a plurality of predefined unwinding processes, and
   perform one or more actions to unwind the at least one CDS transaction according to the determined unwinding process.

7. The system of claim 6, wherein the plurality of predefined unwinding processes include:
   terminating the at least one CDS transaction,
   assigning of the at least one CDS transaction, and
   one of the CDS buyer or the CDS seller entering into an offsetting position with regards to the at least one CDS transaction.

8. The system of claim 1, wherein for at least one of the plurality of CDS transactions, the stored information includes one or more payment terms, and wherein the one or more computer processing devices are further configured to perform one or more actions to facilitate a payment from a first of the CDS buyer or the CDS seller to a second of the CDS buyer or the CDS seller according to the one or more payment terms.

9. A computer-implemented method for facilitating and monitoring credit default swap (CDS) transactions, the method being performed by one or more processors configured to perform a plurality of operations, the operations comprising:
   receiving, at the one or more processors, information relating to a plurality of CDS transactions, including, for each CDS transaction: an identity of a CDS buyer, an identity of a CDS seller, an identity of a reference entity, one or more financial terms relating to the obligations and responsibilities of the CDS buyer and the CDS seller, and one or more credit event terms used for determining the occurrence of a credit event with respect to the CDS transaction;
   determining, by the one or more processors, for each unique entity reflected in the stored information, a net position and exposure of that entity in a marketplace of CDS transactions;
   receiving, at the one or more processors, information relating to a reference entity of a CDS transaction from the plurality of CDS transactions;
   confirming, by the one or more processors, using information from at least two public data sources, an accuracy of the received information relating to the reference entity;
   determining, by the one or more processors, using the information relating to the reference entity and the one or more credit event terms, if a credit event has occurred;
   notifying, by the one or more processors, the CDS buyer of CDS transaction and the CDS seller of the CDS transaction that the credit event has occurred.

10. The method of claim 9, wherein the stored information includes one or more settlement terms relating to settlement of the CDS transaction in the event of a credit default.

11. The method of claim 10, the operations further comprising performing one or more settlement actions according to the one or more settlement terms, wherein the one or more settlement actions include at least a payment from the CDS seller to the CDS buyer.

12. The method of claim 11, wherein the one or more settlement terms include physical settlement terms.

13. The method of claim 11, wherein the one or more settlement terms include cash settlement terms.

14. The method of claim 9, the one or more operations further comprising:
   receiving notice from one of a CDS buyer or a CDS seller of at least one of the plurality of CDS transactions that the at least one CDS transaction is to be unwound,
   determining an unwinding process from a plurality of predefined unwinding processes, and performing one or more actions to unwind the at least one CDS transaction according to the determined unwinding process.

15. The method of claim 14, wherein the plurality of predefined unwinding processes include:
   terminating the at least one CDS transaction, assigning of the at least one CDS transaction; or
   one of the CDS buyer or the CDS seller entering into an offsetting position with regards to the at least one CDS transaction.

16. The method of claim 9, wherein for at least one of the plurality of CDS transactions, the information includes one or more payment terms, and the operations further comprise performing one or more actions to facilitate a payment from a first of the CDS buyer or the CDS seller to a second of the CDS buyer or the CDS seller according to the one or more payment terms.

* * * * *